United States Patent [19]
Hall

[11] Patent Number: 5,471,922
[45] Date of Patent: Dec. 5, 1995

[54] SUPPORT FRAME FOR A FOOD HANDLING EQUIPMENT, SUCH AS A MEAT SLICER OR THE LIKE

[76] Inventor: Donald M. Hall, P.O. Box 1247, Progress St., Kingston, N.Y. 12401

[21] Appl. No.: 113,125

[22] Filed: Aug. 30, 1993

Related U.S. Application Data

[63] Continuation-in-part of Ser. No. 24,010, Mar. 1, 1993, Pat. No. 5,386,787.

[51] Int. Cl.⁶ .................................................. A47B 11/00
[52] U.S. Cl. .............................................. 108/143; 108/25
[58] Field of Search ................................ 108/149, 143, 108/42, 47, 48, 61, 25, 26; 312/122, 281, 317.3; 211/162, 175; 52/29

[56] References Cited

U.S. PATENT DOCUMENTS

| | | | |
|---|---|---|---|
| 758,072 | 4/1904 | Hockersmith | 108/102 |
| 1,756,932 | 5/1930 | Bacher . | |
| 1,899,867 | 2/1933 | Heilinger . | |
| 2,707,659 | 5/1955 | Sloyan . | |
| 2,833,598 | 5/1958 | Sloyan . | |
| 2,934,384 | 11/1959 | Sloyan . | |
| 3,096,583 | 7/1963 | Nevin . | |
| 3,702,209 | 11/1972 | Moore | 108/102 X |
| 4,209,045 | 6/1980 | Bassett | 108/143 X |
| 4,601,226 | 7/1986 | McClintock . | |
| 4,729,536 | 3/1988 | Scala | 108/143 X |
| 4,747,357 | 5/1988 | Guidry et al. | 108/26 X |
| 4,764,049 | 8/1988 | Brown et al. . | |

FOREIGN PATENT DOCUMENTS

| | | | |
|---|---|---|---|
| 2229380 | 12/1973 | Germany | 108/143 |

*Primary Examiner*—Jose V. Chen
*Attorney, Agent, or Firm*—Shlesinger Arkwright & Garvey

[57] ABSTRACT

A support frame for a food handling equipment, such as a meat slicer or the like, includes a base with a pair of laterally spaced immovable rails. A plurality of spaced apart beams extend generally transversely between the rails and are slidable relative to the rails in a first direction. A plurality of saddle members are positioned on the beams for supporting a food handling equipment and slide relative to the beams in a second direction which is generally transverse to the first direction.

28 Claims, 3 Drawing Sheets

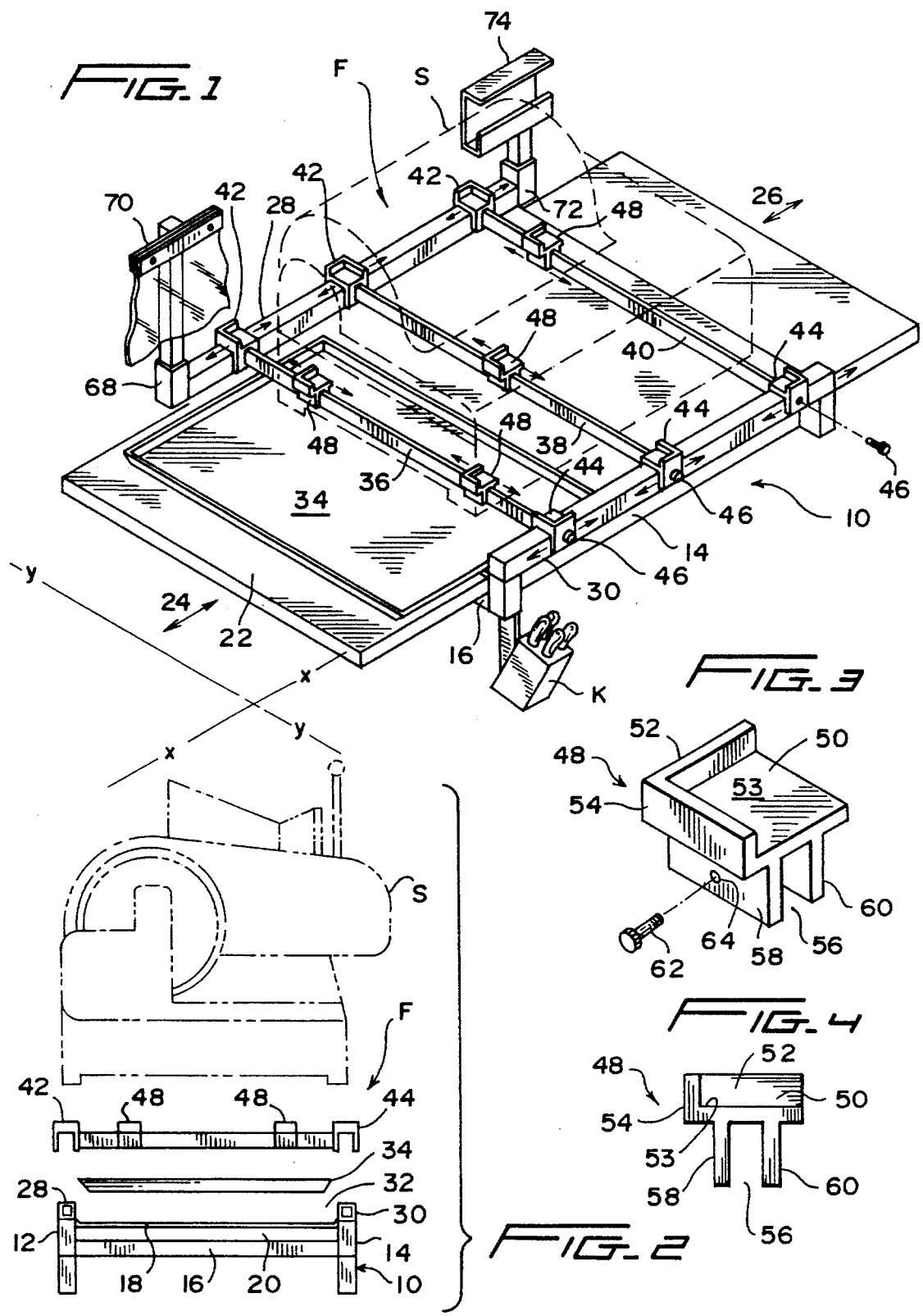

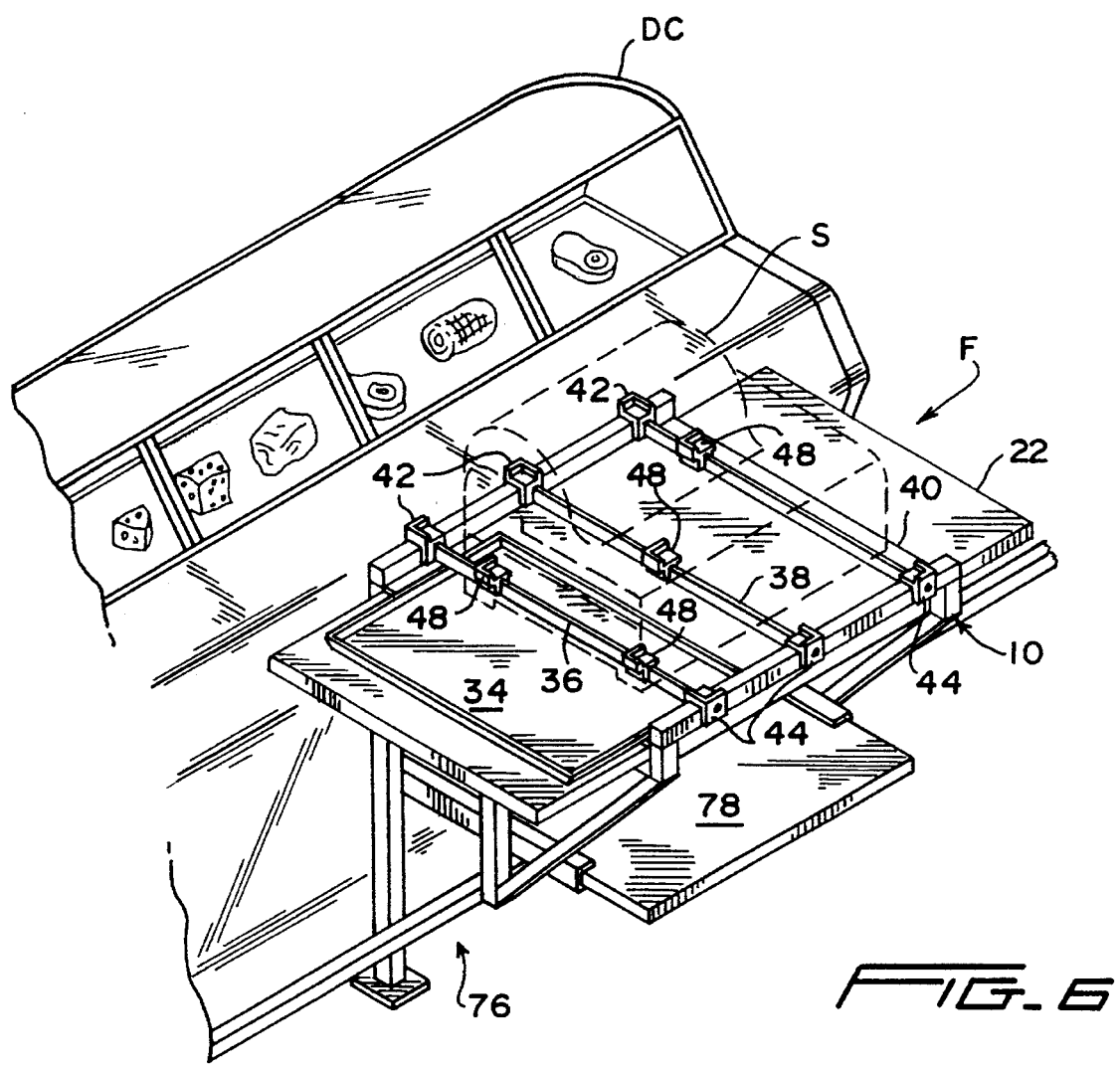
FIG_6
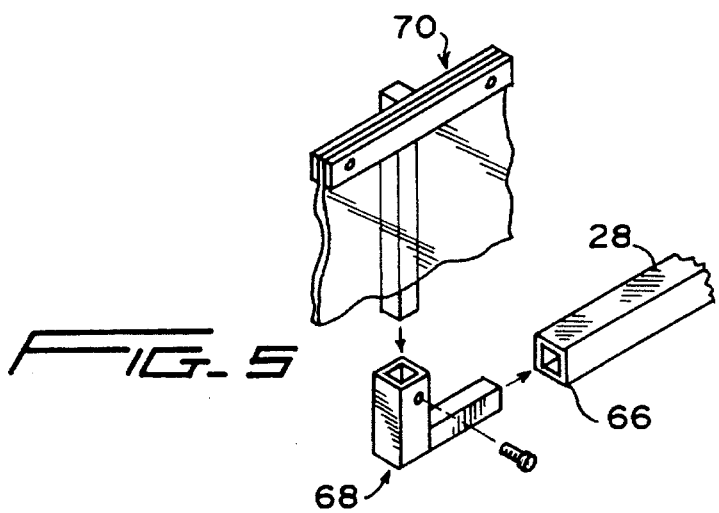
FIG_5

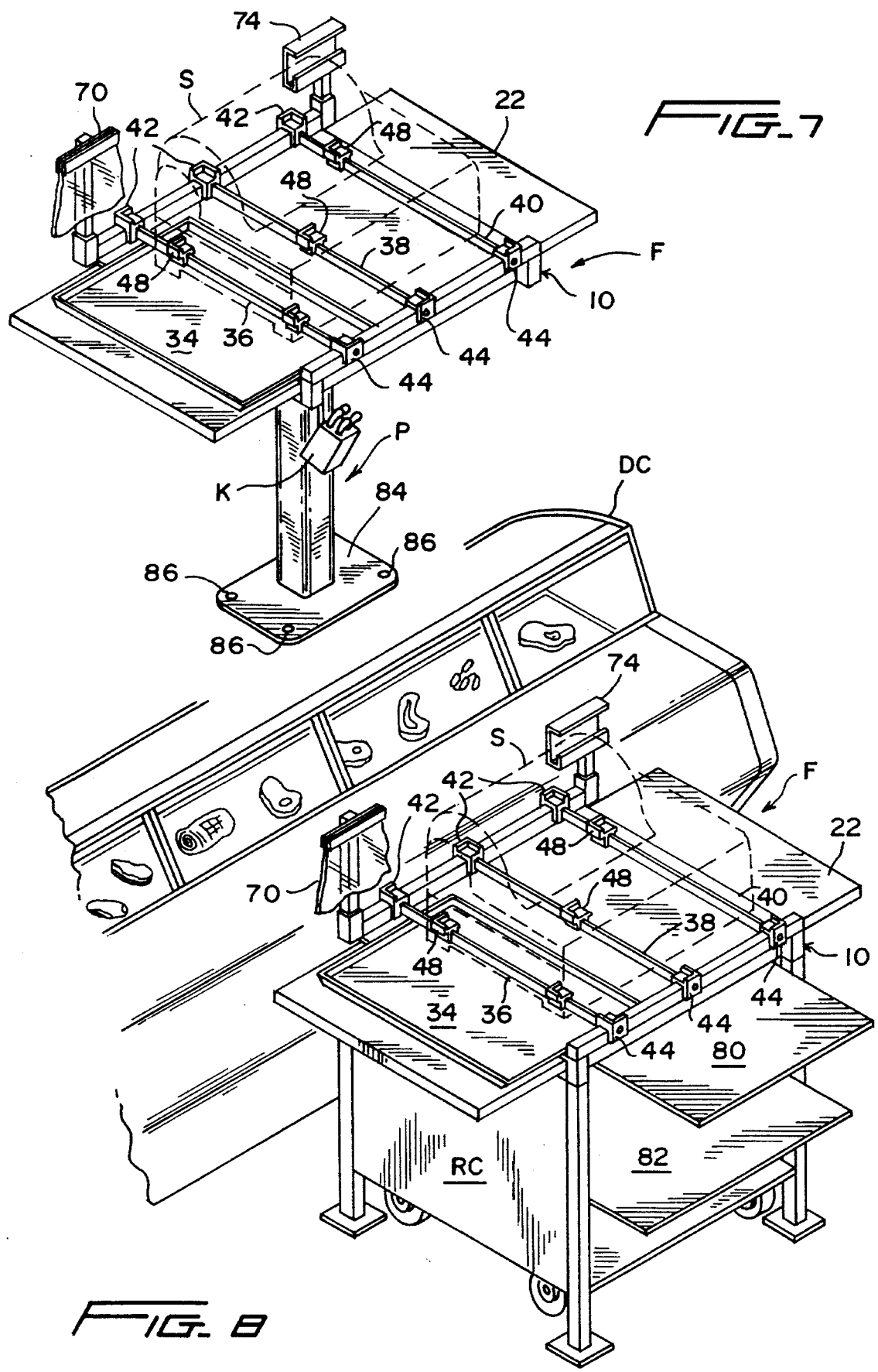

SUPPORT FRAME FOR A FOOD HANDLING EQUIPMENT, SUCH AS A MEAT SLICER OR THE LIKE

CROSS REFERENCE TO RELATED APPLICATIONS

This application is a continuation-in-part of application Ser. No. 08/024,010, filed Mar. 1, 1993, now U.S. Pat. No. 5,386,787 entitled SLIDABLE WORK SURFACE SYSTEM, incorporated herein by reference.

FIELD AND HISTORICAL BACKGROUND OF THE INVENTION

The present invention is directed to support devices for work equipment and, more particularly, to a support frame for a food handling equipment, such as a meat slicer or the like.

Various devices for supporting equipment for working on work pieces are known in the art. Examples of conventional devices are shown in U.S. Pat. Nos. 1,756,932; 1,899,867; 2,707,659; 2,833,598; 2,934,384; 3,096,583; 4,601,226; and 4,764,049.

The prior art devices are, however, bulky, complicated, unwieldy, and do not offer the flexibility needed in the present day environment where it is frequently necessary to remove the work equipment in order to clean the area around the work station, or to substitute one equipment for another. In addition, conventional supports are designed and constructed with the objective that the work equipment is fixedly mounted thereby making it extremely inconvenient to easily remove the work equipment for cleaning purposes, or plainly to substitute one equipment for another. The prior art supports traditionally have also been made of numerous parts thereby making assembly and disassembly rather difficult.

In the retail trade, such as in grocery stores, delicatessens, and bakeries, in particular, there is a need for a support frame for a food handling equipment, such as a meat slicer or the like, which is simple to operate, easy to construct, versatile for accommodating different size equipment, and which can be readily disassembled for cleaning. The ability to clean a device is particularly important in the retail trade of food in view of strict governmental regulations.

OBJECTS AND SUMMARY OF THE INVENTION

The principal object of the invention is to provide a support frame for a food handling equipment which overcomes the drawbacks of existing devices.

Another object of the invention is to provide a support frame for a food handling equipment which offers the flexibility of supporting various equipment of different sizes, or having offset footprints.

Yet another object of the invention is to provide a support frame for a food handling equipment that offers the flexibility and great convenience of removing the equipment for cleaning purposes.

Still yet another object of the invention is to provide a support frame for a food handling equipment which is simple in construction, easy to use, and easy to assemble and disassemble.

An additional object of the present invention is to provide a support frame for a food handling equipment which is greatly versatile in that it can be used in connection with different types of food handling or the like stations, such as a food display case, a pedestal, or a roll-cart.

Yet an additional object of the invention is to provide a support frame for a food handling equipment which helps improve hygiene in and around work stations, and especially in an environment where food for human consumption is being handled.

Still yet an additional object of the invention is to provide a support frame for a food handling equipment which can be used in conjunction with an upstanding food handling or the like station thereby enabling the operator to have a face-to-face contact with a consumer.

A further object of the invention is to provide a food handling apparatus for use in the retail trade, such as in grocery stores, delicatessens, bakeries, etc.

In summary, the main object of the invention is to provide a support frame for a food handling equipment which overcomes the drawbacks associated with the conventional devices, is easy to use, versatile, and helps improve hygiene in and around a work station, such as in grocery stores, delicatessens, bakeries, etc.

BRIEF DESCRIPTION OF THE DRAWINGS

The above and other objects and advantages and novel features of the present invention will become apparent from the following detailed description of the preferred embodiment of the invention illustrated in the accompanying drawings, wherein:

FIG. 1 is a perspective view of the support frame of the invention, shown with the general outline of a food handling equipment in phantom lines and with various accessories;

FIG. 2 is an exploded, end elevational view of the support frame shown in FIG. 1, shown with a food slicer in phantom lines;

FIG. 3 is an enlarged perspective view of a saddle member of the support frame of the invention;

FIG. 4 is a front elevational view of the saddle member shown in FIG. 3;

FIG. 5 is an exploded view illustrating the details of an accessory socket fitting;

FIG. 6 is a perspective view of the support frame of the invention, shown mounted behind a display case;

FIG. 7 is a perspective view of an upstanding food handling apparatus, shown with the support frame of the invention; and FIG. 8 is a perspective view of the support frame of the invention, shown mounted on a roll-cart.

DETAILED DESCRIPTION OF THE INVENTION

As best shown in FIGS. 1 and 2, support frame F of the invention includes a generally rectangular base 10, made from a conventional material, such as stainless steel. In fact, the entire frame F can be made of stainless steel, plastic, aluminum, or other functionally equivalent material.

Base 10 includes left and right sidewalls 12 and 14 that extend above bottom 16 thereof. A panel 18, generally corresponding in shape and size to base 10, is mounted above bottom 16 and in between sidewalls 12 and 14. A recess 20, corresponding in shape and size to base 10, is therefore formed between bottom 16 and panel 18, for slidably receiving a work top 22. Depending upon the need, top 22 can be pulled out from or pushed into frame F (shown by arrows 24 and 26) for providing extra work space. While not shown, a conventional stop mechanism(s) may be provided to prevent accidental, inadvertent withdrawal of top 22 from recess 20 during its pulling or pushing adjustment relative to frame F. Likewise, clamping mechanism may also be provided to stabilize top 22 at a preferred location relative to frame F. The top 22, although can be made of any conventional material, it has been successfully fabricated from polyethylene, such as POLSAN™.

Left and right, preferably parallel, hollow rails 28 and 30 are immovably mounted on sidewalls 12 and 14, respectively. The rails 28 and 30 run generally the length of corresponding walls 12 and 14 and, together with panel 18 form an upwardly open recess 32, which generally corresponds in shape and size to the recess 20 below. A tray 34 may be slid into recess 32 and under the equipment, such as slicer S, for collecting any matter, such as crumbs, that may fall off during handling of the food. Tray 34 may preferably be made of stainless steel, plastic, aluminum, or other functionally equivalent material.

Three thin steel beams 36, 38 and 40, are supported on rails 28 and 30, and extend generally transverse thereto. Each of the beams is provided with two types of saddle members that help support an equipment, such as slicer S, as shown. In particular, each of the beams 36, 38 and 40, is provided with two immovable saddle members 42 and 44, at the ends thereof, that allow the respective beam to slide on the rails 28 and 30. The relative positions of the beams 36, 38 and 40, on rails 28 and 30, however, can be fixed by conventional screw fastener 46. Each of the beams 36, 38 and 40, is also provided with one or more of saddle members 48 that slide across the beams. Therefore, while saddle members 42 and 44, slide on rails 28 and 30, they do not, however, slide across the beams. The beams 36, 38 and 40 are, therefore, slidable on rails 28 and 30 along x-axis, and saddle members 48 in a y-axis, as shown.

One of ordinary skill in the art would appreciate that x and y directions are transverse to one another and offer the user with a great flexibility in accommodating equipment of different sizes on support frame F. (It should be noted that while only three beams with only a small number of slidable saddle members 48, are shown, it is well within the scope of this invention to vary the numbers for each to accommodate the user's specifications.) As shown in FIG. 1, beams 36, 38 and 40, run generally parallel to one another, and likewise rails 28 and 30 also run parallel to one another, it is, however, within the scope of this invention to vary this orientation.

As best shown in FIGS. 3 and 4, each slidable saddle member 48 has a generally planar top 53 with recess 50. The recess 50 is bound on two sides by upwardly extending walls 52 and 54. A downwardly open channel 56, bound by parallel vertical walls 58 and 60, is provided below recess 50. Channel 56 is of a dimension that corresponds to the cross-sectional dimension of beams 36, 38 and 40, such that saddle members 48 snugly, but slidably, engage the beams. Each saddle member 48 is provided with conventional screw fastener 62 in a hole 64, for immobilizing saddle 48 at a desired location on the respective beam. By unscrewing fastener 62, saddle 48 can be moved across the respective beam in a known manner.

The saddle members 42 and 44 are similar in configuration to saddles 48, with the exception that they are made to slidably engage rails 28 and 30, the dimensions of which may be different from beams 36, 38 or 40. In this regard, it is noted that the tops 53 of both immovable saddle members 42 and 44, and movable saddle members 48, extend in a generally common horizontal plane so as to stabilize slicers horizontally on frame F.

As noted above, left and rights rails 28 and 30, are preferably hollow and, therefore, the ends thereof function as sockets for installing accessory devices to the support frame F. As best shown in FIG. 5, end 66 of rail 28 receives a generally L-shaped bracket 68 for supporting, for example, a plastic bag holder 70 in a conventional manner. As shown in FIG. 1, the end 72 opposite to the end 66, is shown with a holder 74 that receives a tissue dispenser. A knife block K is also shown mounted to a preferred location on the frame F.

FIG. 6 illustrates the use of support frame F of the invention in a typical retail trade environment. In particular, support frame F is shown positioned behind conventional display case DO. In particular, frame F is supported on a support assembly 76. In this application, a slidable shelf 78 is also provided on support assembly 76, to offer extra work space for the operator. FIG. 8, likewise, shows support frame F of the invention positioned behind display case DC. The frame F, however, is mounted on conventional roll-cart RC and offers the additional flexibility of moving the work station from one place to another. The roll-cart RC in FIG. 8, has been shown with additional shelves 80 and 82 to provide extra work space.

FIG. 7 discloses support frame F mounted on a pedestal, reinforced support column, or stand assembly P having a base 84. One of ordinary skill in the art would appreciate that by using conventional fasteners in holes 86, the food handling station can be fixedly mounted at a desired location.

USE AND OPERATION

Initially, it should be noted that the support frame F can be used in various applications. As shown in FIGS. 6–8, frame F can be fixedly mounted to a display case (FIG. 6), or on a roll-cart and moved in or about a work area (FIG. 8). In addition, as shown in FIG. 7, support frame F, having the configuration of an upstanding apparatus, can be fixedly mounted on the floor of the working area. In this connection, it should also be noted that the use of work top 22 and crumb tray 34 is not necessary, but is recommended. When used in conjunction with work top 22 and crumb tray 34, however, support frame F functions as a work station with various applications, examples of which are shown in FIGS. 6–8. In other words, support frame F is extremely versatile in that it can be easily utilized as a self-standing work station by adding only a few components.

In a typical application, support frame F would be mounted on a support, such as a roll-cart or support column (FIGS. 7–8). When it is desired to place an equipment, such as slicer S, the relative positions of the beams 36, 38 and 40 along the x direction, and the relative positions of saddles 48 along the y direction, are changed to correspond to the configuration of the foot print of the slicer. (It should be noted that in the arrangement shown in FIGS. 1–8, the positions of the saddle members 42 and 44, would be changed when the corresponding beam is moved on rails 28 and 30. However, it is within the scope of the invention to provide an arrangement where saddle members 42 and 44 move independently of beams 36, 38 and 40, on rails 28 and 30.)

The slicer is then placed such that the outline of its footprint is received in top recesses of various saddles. When it is desired to remove the equipment, it is simply lifted off support frame F and, another equipment can be easily placed by adjusting the positions of beams 36, 38 and 40 and saddles 48, to correspond to the footprint of the new equipment. During use, tray 34 can be positioned below slicer S, for catching and collecting any crumbs that may fall during slicing of food, such as meat. The tray 34 can be easily pulled out for cleaning.

While this invention has been described as having a preferred embodiment, it is understood that it is capable of further modifications, uses and/or adaptations following in general the principle of the invention and including such departures from the present disclosure as come within the known or customary practice in the art to which the invention pertains, and as may be applied to the central features hereinbefore set forth, and fall within the scope of the invention and of the limits of the appended claims.

What is claimed is:

1. A support frame for a food handling equipment, comprising:
   a) a base including a pair of laterally spaced immovable rails;
   b) a plurality of spaced apart beams extending generally transversely between said pair of rails;
   c) said beams being slidable relative to said rails in a first direction;
   d) means positioned on said beams for supporting a handling equipment;
   e) said equipment supporting means including a plurality of saddle members comprising first and second sets;
   f) said first set of saddle members being slidable relative to said beams in a second direction generally transverse to said first direction; and
   g) at least one of said first set of saddle members being movable independently of the other ones of said first saddle members.

2. The support frame of claim 1, wherein:
   a) said second set of saddle members is fixed relative to said beams, but slidable relative to said rails.

3. The support frame of claim 1, wherein:
   a) each said saddle member includes upper and lower sections; and
   b) said lower section of said saddle member includes a channel for sliding over the corresponding beam and rail.

4. The support frame of claim 1, wherein:
   a) each said saddle member includes upper and lower sections; and
   b) said upper section of a plurality of said saddle members includes a recess for receiving a portion of the equipment.

5. The support frame of claim 1, wherein:
   a) said base includes a bottom panel member;
   b) said panel member is connected to and extends between said pair of rails; and
   c) said panel member is spaced apart from and extends below said beams; and,
   d) said panel member, said beam, and said pair of rails define a first recess for receiving means for collecting the matter falling from the equipment during handling of food.

6. The support frame of claim 5, and including:
   a) means for collecting the falling matter received in said first recess.

7. The support frame of claim 5, wherein:
   a) said base includes a second recess disposed below said bottom panel member for receiving shelf means.

8. The support frame of claim 7, and including:
   a) shelf means received in said second recess.

9. The support frame of claim 1, in combination with a display case.

10. The support frame of claim 1, in combination with an upstanding support.

11. The support frame of claim 1, in combination with a roll-cart support stand.

12. The support frame of claim 1, wherein:
    a) at least one of said plurality of beams is movable independently of the other ones of said plurality of beams.

13. An upstanding food handling apparatus for use in a retail food delivery trade, comprising:
    a) a base stand;
    b) a work station supported on said base stand;
    c) said work station including a main frame of supporting a food handling equipment; and
    d) said main frame comprising:
       i) a base frame including a pair of laterally spaced immovable rails;
       ii) a plurality of spaced apart beams extending generally transversely between said pair of rails;
       iii) said beams being slidable relative to said rails in a first direction;
       iv) at least one of said plurality of beams being movable independently of the other ones of said plurality of beams;
       v means positioned on said beams for supporting the handling equipment;
       vi said equipment supporting means including a plurality of saddle members comprising first and second sets; and
    e) said first set of saddle members being slidable relative to said beams in a second direction generally transverse to said first direction.

14. The food handling apparatus of claim 13, wherein:
    a) said second set of saddle members is fixed relative to said beams, but slidable relative to said rails.

15. The food handling apparatus of claim 13, wherein:
    a) each said saddle member includes upper and lower sections; and
    b) said lower section of said saddle member includes a channel for sliding over the corresponding beam.

16. The food handling apparatus of claim 15, wherein:
    a) said upper section of said saddle member includes a recess for receiving a portion of the equipment.

17. The food handling apparatus of claim 13, wherein:
    a) said base frame includes a bottom panel member;
    b) said panel member is connected to and extends between said pair of rails; and
    c) said panel member is spaced apart from and extends below said beams; and,
    d) said panel member, said beams, and said pair of rails define a first recess for receiving means for collecting the matter falling from the equipment during handling of food.

18. The food handling apparatus of claim 17, and including:
    a) means for collecting the falling matter received in said first recess.

19. The food handling apparatus of claim 17, wherein:

a) said base includes a second recess disposed below said bottom panel member for receiving shelf means.

20. The food handling apparatus of claim 19, and including:

a) shelf means received in said second recess.

21. The food handling apparatus of claim 13, in combination with a display case.

22. The food handling apparatus of claim 13, wherein:

a) at least one of said first set of saddle members is movable independently of the other ones of said first saddle members.

23. A support frame for a piece of equipment, comprising:

a) a base including a pair of laterally spaced rails;

b) a plurality of spaced apart beams extending generally transversely between said pair of rails;

c) means positioned on said beams for supporting a piece of equipment;

d) said base includes a bottom panel member;

e) said panel member is connected to and extends between said pair of rails;

f) said panel member is spaced apart from and extends below said beams; and, g) said panel member, said beams, and said pair of rails define a first recess for receiving means for collecting debris falling from the equipment.

24. The support frame of claim 23, wherein:

a) means for collecting the falling debris is received in said first recess.

25. The support frame of claim 23, wherein:

a) said equipment supporting means includes a plurality of saddle members; and b) at least one of said saddle members is movable relative to the other said saddle members.

26. The support frame of claim 23, wherein:

a) at least one of said beams is movable relative to the other said beams.

27. The support frame of claim 23, in combination with:

a) a base stand disposed adjacent to and supporting said base.

28. The support frame of claim 27, in combination with:

a) a work station.

\* \* \* \* \*